United States Patent
Fuji

(10) Patent No.: US 6,459,905 B1
(45) Date of Patent: Oct. 1, 2002

(54) MOBILE COMMUNICATION SYSTEM

(75) Inventor: Tsuyoshi Fuji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/341,275

(22) PCT Filed: Apr. 22, 1998

(86) PCT No.: PCT/JP98/01852

§ 371 (c)(1),
(2), (4) Date: Jul. 7, 1999

(87) PCT Pub. No.: WO99/55019

PCT Pub. Date: Oct. 28, 1999

(51) Int. Cl.⁷ .............................. H04B 1/38; H04B 7/15; H04B 7/185; H04M 1/00

(52) U.S. Cl. ...................... 455/552; 455/11.1; 455/12.1; 455/13.1

(58) Field of Search ........................... 455/7, 11.1, 12.1, 455/13.1, 15, 19, 20, 21, 427, 430, 552

(56) References Cited

U.S. PATENT DOCUMENTS

| | | | | |
|---|---|---|---|---|
| 5,490,284 A | * | 2/1996 | Itoh et al. | |
| 5,628,049 A | * | 5/1997 | Suemitsu | 455/11.1 |
| 5,907,541 A | * | 5/1999 | Fairholm et al. | 370/316 |
| 5,950,127 A | * | 9/1999 | Nitta et al. | 455/426 |
| 5,956,620 A | * | 9/1999 | Lazaris-Brunner et al. | 455/12.1 |
| 5,991,599 A | * | 11/1999 | Uchikawa | 455/20 |
| 5,995,332 A | * | 11/1999 | Mallinckrodt | 455/427 |
| 6,052,558 A | * | 4/2000 | Cook et al. | 455/12.1 |
| 6,052,586 A | * | 4/2000 | Karabinis | 455/427 |
| 6,088,570 A | * | 7/2000 | Komara et al. | 455/11.1 |
| 6,122,524 A | * | 9/2000 | Goerke | 455/552 |
| 6,223,053 B1 | * | 4/2001 | Friedmann et al. | 455/552 |

OTHER PUBLICATIONS

The IEEE Standard Dictionary of Electrical and Electronics Terms, 6th ed. Insitute of Electrical and Electronics Engineers, Inc. pp. 159, 290, 323. TK9.1478 1997.*

* cited by examiner

Primary Examiner—Nay Maung
Assistant Examiner—Miguel D. Green
(74) Attorney, Agent, or Firm—Rothwell, Figg, Ernst & Manbeck

(57) ABSTRACT

A mobile communication system with a portable telephone capable of automatically switching between a ground communication system and a satellite communication system, in which when the ground satellite system is not available and the portable telephone is in a place where a satellite from the satellite communication system cannot be observed, a signal process operation is switched in such a manner that an RF signal is processed by the ground communication system, and both of an IF signal and a baseband signal are processed by the satellite communication system; and a relaying apparatus for performing a converting operation of the RF signal in the satellite communication system and the RF signal in the ground communication system. The ground communication system and the satellite communication system can be automatically switched to be used without replacing the antenna/radio frequency units. Also, when the satellite communication system is utilized in an indoor area, the structure of the relaying apparatus can be simplified.

2 Claims, 8 Drawing Sheets

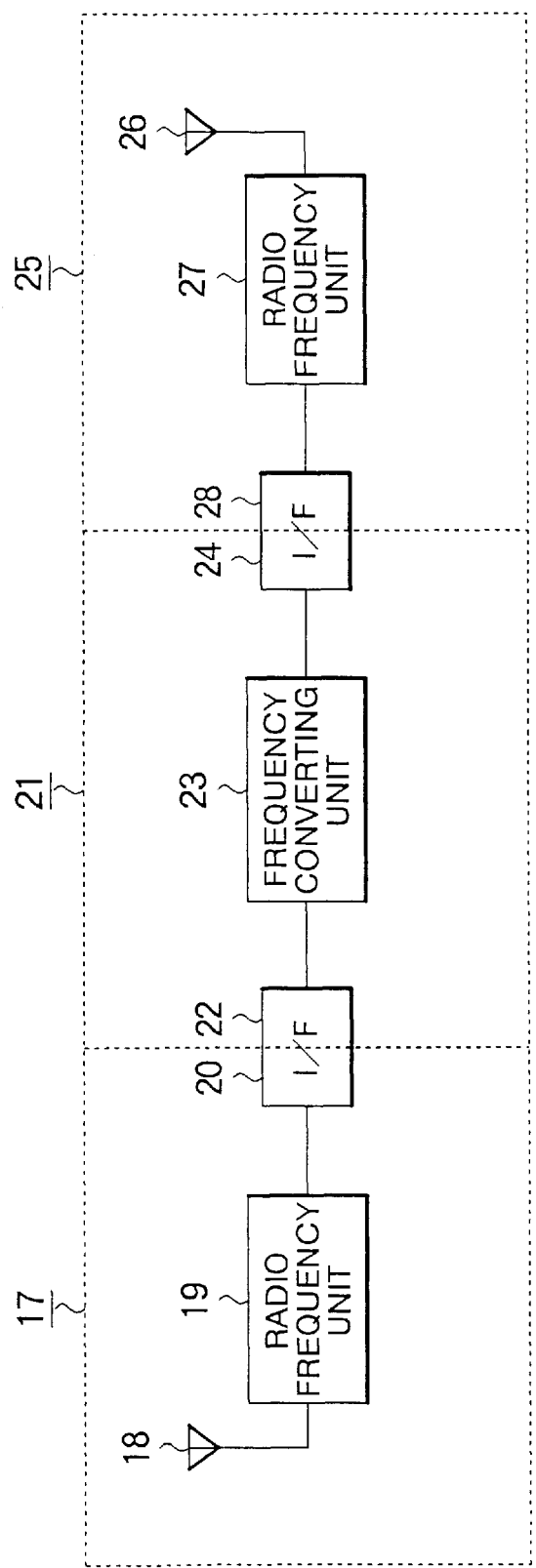

though the radio frequency unit owns such a function to convert frequencies in

MOBILE COMMUNICATION SYSTEM

TECHNICAL FIELD

This invention is related to a mobile communication system equipped with a portable telephone usable in both a ground system and a satellite system, and a relaying apparatus of this portable telephone.

BACKGROUND ART

Referring now to drawings, a description will be made for a conventional mobile communication system equipped with a portable telephone and a relaying apparatus of this portable telephone. FIG. 6 is a block diagram for schematically showing, for instance, an arrangement of the conventional portable telephone disclosed in Japanese Unexamined Patent Application No. 8-70262.

In FIG. 6, reference numeral 1 shows a ground system antenna/radio frequency unit; reference numeral 2 represents an interface of the ground system antenna/radio frequency unit 1; reference numeral 3 indicates a satellite system antenna/radio frequency unit; reference numeral 4 denotes an interface of the satellite system/radio frequency unit 3; reference numeral 5 is a radio control unit; and reference numeral 6 shows an interface for connecting any one of the ground system antenna/radio frequency unit 1 or the satellite system antenna/radio frequency unit 3 with the radio control unit 5.

FIG. 7 is a block diagram for indicating a detailed arrangement of the ground system antenna/radio frequency unit and of the radio control unit of the conventional portable telephone.

In FIG. 7, reference numeral 7 shows an antenna of a ground system, and reference numeral 8 represents a radio frequency unit. Also, reference numeral 9 indicates a receiving IF circuit; reference numeral 10 is a demodulator for demodulating an output signal of the receiving IF circuit 9; reference numeral 11 shows a baseband processing unit for processing an output signal of the demodulator 10; reference numeral 12 indicates a modulator for modulating a signal derived from the baseband processing unit 11; and reference numeral 13 shows a transmitting IF circuit for converting an output signal of the modulator 12 into a transmitting IF signal. Furthermore, reference numeral 14 shows a keyboard connected to the baseband processing unit 11; reference numeral 15 indicates a display unit for displaying a signal derived from the baseband processing unit 11; and reference numeral 16 denotes a transmitter/receiver connected to the baseband processing unit.

Furthermore, FIG. 8 is a block diagram representing, for example, an arrangement of the relaying apparatus of the conventional portable telephone disclosed in Japanese Unexamined Patent Application No. 8-70262.

In FIG. 8, reference numeral 17 shows a satellite system antenna/radio frequency unit; reference numeral 18 is a satellite system antenna; reference numeral 19 indicates a radio frequency unit; and reference numeral 20 shows an interface. Also, reference numeral 21 denotes a repeater connected to the satellite system antenna/radio frequency unit 17; reference numeral 22 indicates an interface; reference numeral 23 represents a frequency converting unit; and reference numeral 24 denotes an interface. Furthermore, reference numeral 25 shows a ground system antenna/radio frequency unit connected to the repeater 21; reference numeral 26 denotes a ground system antenna; reference numeral 27 represents a radio frequency unit; and reference numeral 28 shows an interface.

Next, a description will now be made of operations of the conventional mobile communication system equipped with the portable telephone and the relaying apparatus thereof. A single portable telephone which may be employed in both a mobile communication system of a ground system and another mobile communication system of a satellite system, namely a so-called "dual mode portable telephone," is required to be operable in the mobile communication systems in both of the ground system and the satellite system.

Generally specking, in a ground communication system and a satellite communication system, radio interfaces, for instance, transmission/reception frequencies, modulating/demodulating methods, information transfer speeds and the like are different from each other.

As a result, in a dual mode portable telephone, two sets of antennas and radio frequency units are provided which are operable with respect to the ground communication system and the satellite communication system. Also, as indicated in FIG. 6, the ground system antenna/radio frequency unit 1 and the satellite system antenna/radio go frequency unit 3 are used in the replacement manner.

In the conventional apparatus of FIG. 6, when the portable telephone is used in the ground communication system, the ground system antenna/radio frequency unit 1 is connected to the radio control unit 5 so as to use this portable telephone. When the portable telephone is used in the satellite communication system, the satellite system antenna/radio frequency unit 3 is connected to the radio control unit 5 so as to use this portable telephone.

FIG. 7 is a block diagram for showing a detailed arrangement in the case that the ground system antenna/radio frequency unit 1 is connected to the radio control unit 5. A reception electromagnetic wave from the ground communication system is received by the antenna 7, and then is converted into an IF signal by the radio frequency unit 8.

This IF signal is supplied via the interfaces 2 and 6 and the receiving IF circuit 9 to the demodulator 10 so as to be demodulated. This demodulation signal is converted into a speech signal by the baseband processing unit 11, and then the speech signal is supplied to the transmitter/receiver 16.

Conversely, another speech signal entered from the transmitter/receiver 16 is processed by the baseband processing unit 11, and thereafter the processed speech signal is modulated by the modulator 12. This modulation signal is converted into a transmitting IF signal by the transmitting IF circuit 13, and then this transmitting IF signal is supplied via the interfaces 6 and 2 to the radio frequency unit 8.

In the radio frequency unit 8, the transmitting IF signal is converted into a transmit signal having a frequency fitted to the radio interface of the ground communication system. Then, this transmit signal is transmitted from the antenna 7.

In the ground communication system, as the radio frequency, for example, frequencies in a 900 MHz band are employed. The radio frequency unit 8 has a function to convert the frequencies in the 900 MHz band into IF frequencies.

On the other hand, in the case that the portable telephone is used in the satellite communication system, the satellite system antenna/radio frequency unit 3 is connected to the interface 6 of the radio control unit 5 instead of the ground system antenna/radio frequency unit 1.

Also, an internal arrangement of the satellite system antenna/radio frequency unit is similar to that of the ground system antenna/radio frequency unit 1. In this case, the radio frequency unit 3 owns such a function to convert frequencies used in the satellite communication system, for instance, frequencies in 1.6 GHz and 2 GHz bands into IF frequencies.

Generally speaking, since the modulating systems, the information transfer speeds, and the protocol are different from each other in the ground communication system and the satellite communication system, these items should be switched. As a consequence, a demodulation control signal "a" and a modulation control signal "b" are sent from any one of the ground system antenna/radio frequency unit 1 or the satellite system antenna/radio frequency unit 3 to the demodulator 10, the modulator 12, and the baseband processing unit 11 employed in the radio control unit 5, and thus these items are properly switched.

A demodulation control signal "a" and a modulation control signal "b" are outputted from any one of a ground system or a satellite system antenna/radio frequency unit. That is, the demodulation control signal "a" and the modulation control signal "b", which correspond to the ground communication system, are outputted from the ground system antenna/radio frequency unit 1, whereas the demodulation control signal "a" and the modulation control signal "b", which correspond to the satellite communication system, are outputted from the satellite system antenna/radio frequency unit 3.

In a dual mode portable telephone, there are many possibilities that a ground communication system is used in a place where this ground communication system is available, whereas a satellite communication system is used in a place where the ground communication system is not available. However, as to the satellite system, the portable telephone cannot be independently utilized in a basement and an indoor area, where the satellites cannot be directly observed. Therefore, it is conceivable that the satellite relaying apparatus as shown in FIG. 8 is used.

In such a case that the portable telephone is used in the place where the ground communication system cannot be utilized and furthermore in an indoor area where the satellites cannot be directly observed, this satellite relaying apparatus is installed at a window through which the satellites can observe in order that the satellite communication system can be used in the indoor area.

In this case, as the portable telephone, while the ground system antenna/radio frequency unit 1 is connected to the radio control unit 5, this portable telephone is operated as the ground communication system. On the other hand, a reception signal from the satellite communication system is received by the satellite system antenna 18 of the satellite relaying apparatus to be converted into an IF signal by the radio frequency unit 19.

This IF signal is inputted via the interfaces 20 and 22 into the frequency converting unit 23. After the frequency of this IF signal is converted, the IF signal having the proper frequency is entered via the interfaces 24 and 28 to the ground system antenna/radio frequency unit 25.

In this ground system antenna/radio frequency unit 25, the frequency-converted IF signal is again converted by the radio frequency unit 27 into the radio frequency of the ground communication system, and thereafter this IF signal having the radio frequency of the ground communication system is transmitted from the antenna 26.

The electromagnetic wave of this ground communication system is received by the ground system antenna 7 of the portable telephone, and the reception signal from the satellite is correctly received by the portable telephone. The transmission signal from the portable telephone is penetrated through a signal path opposite to the above-described signal path, so that the correct communication can be carried out between the satellite and the portable telephone.

The above-described mobile communication system owns a problem. That is, in the case that the satellite communication system is utilized in the indoor area by using the relaying apparatus, if the user tries to directly use the satellite communication system, then the user must replace the ground system antenna/radio frequency unit 1 by the satellite system antenna/radio frequency unit 3 in order to use the portable telephone.

Also, the conventional mobile communication system owns another problem, That is, in such a case that the radio interface such as the modulating system of the ground communication system is different from that of the satellite communication system, the relaying apparatus does not merely perform the frequency converting operation, but must convert the modulating systems.

The present invention has been made to solve the above-explained problems, and therefore, has an object to accomplish a mobile communication system equipped with a portable telephone capable of automatically switching a ground communication system and a satellite communication system without replacing antenna/radio frequency units.

Also, the present invention has been made to solve the above-described problems, and therefore, has an object to accomplish a mobile communication system equipped with a relaying apparatus of a portable telephone capable of utilizing a satellite communication system in an indoor area with employment of a simple arrangement.

DISCLOSURE OF THE INVENTION

A mobile communication system, according to the present invention, is comprised of: a portable telephone useable for automatically switching a ground communication system and a satellite communication system, in which in such a case that while the ground satellite system is not available in a place where a satellite of the satellite communication system cannot observe, an radio interface of the ground satellite system is different from a radio interface of the satellite communication system, a signal process operation is switched in such a manner that an RF signal is processed by the ground communication system, and both in IF signal and a baseband signal are processed by the satellite communication system; and a relaying apparatus for performing a converting operation of the RF signal in the satellite communication system and the RF signal in the ground communication system.

Also, in the mobile communication system according to the present invention, the above-described portable telephone is comprised of: a commonly-used antenna for transmitting/receiving the signal of the ground communication system and also the signal of the satellite communication system; a duplexer connected to the commonly-used antenna for duplexing transmission/reception signals; a first switch for switching an output of the commonly-used antenna; a satellite system receiving radio frequency unit connected to the first switch; a ground system receiving radio frequency unit connected to the first switch; a second switch connected to the satellite system receiving radio frequency unit and to the ground system receiving radio frequency unit; a receiving IF circuit connected to the second switch; a demodulator for demodulating an output of the receiving IF circuit; a baseband processing unit into which the demodulation output of the demodulator is entered; a modulator for modulating an output of the baseband processing unit; a transmitting IF circuit connected to the modulator; a synthesizer for supplying a local signal to the receiving IF circuit and the transmitting IF circuit; a third switch connected to the transmitting IF circuit; a satellite system transmitting radio frequency unit connected to the third switch; a ground system transmitting radio frequency unit connected to the third switch; a fourth switch connected to the satellite system transmitting radio frequency unit and the ground system transmitting radio frequency unit, whose output is supplied to the duplexer; and a CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to a first control signal; the synthesizer produces a local signal suitably used to convert the ground system RF signal into an IF signal in response to a second control signal; and the demodulator and the modulator are controlled so as to be operable by the modulating/demodulating methods of the satellite communication system in response to a third control signal.

Also, in the mobile communication system according to the present invention, the above-described portable telephone is comprised of: a satellite system antenna for transmitting/receiving a signal of the satellite communication system; a ground system antenna for transmitting/receiving a signal of the ground communication system; a first duplexer connected to the satellite system antenna, for duplexing the transmission/reception signal of the satellite communication system; a second duplexer connected to the ground system antenna, for duplexing the transmission/reception signal of the ground communication system; a satellite system receiving radio frequency unit connected to the first duplexer; a ground system receiving radio frequency unit connected to the second duplexer; a first switch connected to the satellite system receiving radio frequency unit and to the ground system receiving radio frequency unit; a receiving IF circuit connected to the first switch; a demodulator for demodulating an output of the receiving IF circuit; a baseband processing unit into which the demodulation output of the demodulator is entered; a modulator for modulating an output of the baseband processing unit; a transmitting IF circuit connected to the modulator; a synthesizer for supplying a local signal to the receiving IF circuit and the transmitting IF circuit; a second switch connected to the transmitting IF circuit; a satellite system transmitting radio frequency unit connected to the second switch, the output of which is supplied to the first duplexer; a ground system transmitting radio frequency unit connected to the second switch, the output of which is supplied to the second duplexer; and a CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the first and second switches are controlled so as to connect the ground system receiving radio frequency unit and the ground system transmitting radio frequency unit in response to a first control signal; the synthesizer produces a local signal suitably used to convert the ground system RF signal into an IF signal in response to a second control signal; and the demodulator and the modulator are controlled so as to be operable by the modulating/demodulating methods of the satellite communication system in response to a third control signal.

Also, in the mobile communication system according to the present invention, the above-described portable telephone is comprised of: a commonly-used antenna for transmitting/receiving the signal of the ground communication system and also the signal of the satellite communication system; a duplexer connected to the commonly-used antenna for duplexing transmission/reception signals; a receiving radio frequency unit connected to the duplexer, capable of commonly processing a reception signal of the ground communication system and a reception signal of the satellite communication system; a receiving IF circuit connected to the receiving radio frequency unit; a demodulator for demodulating an output of the receiving IF circuit; a baseband processing unit into which the demodulation output of the demodulator is entered; a modulator for modulating an output of the baseband processing unit; a transmitting IF circuit connected to the modulator; a synthesizer for supplying a local signal to the receiving IF circuit and the transmitting IF circuit; a transmitting radio frequency unit connected to the transmitting IF circuit, capable of commonly processing a transmission signal of the ground communication system and a reception signal of the satellite communication system; and a CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to a first control signal; the synthesizer produces a local signal suitably used to convert the ground system RF signal into an IF signal in response to a second control signal; and the demodulator and the modulator are controlled so as to be operable by the modulating/demodulating methods of the satellite communication system in response to a third control signal.

A mobile communication system, according to the present invention, is comprised of a portable telephone including: a commonly-used antenna for transmitting/receiving a signal of a ground communication system and also a signal of a satellite communication system; a duplexer connected to the commonly-used antenna for duplexing transmission/reception signals; a first switch for switching an output of the commonly-used antenna; a satellite system receiving radio frequency unit connected to the first switch; a ground system receiving radio frequency unit connected to the first switch; a second switch connected to the satellite system receiving radio frequency unit and to the ground system receiving radio frequency unit; a receiving IF circuit connected to the second switch; a demodulator for demodulating an output of the receiving IF circuit; a baseband processing unit into which the demodulation output of the demodulator is entered; a modulator for modulating an output of the baseband processing unit; a transmitting IF circuit connected to the modulator; a synthesizer for supplying a local signal to the receiving IF circuit and the transmitting IF circuit; a third switch connected to the transmitting IF circuit; a satellite system transmitting radio frequency unit connected to the third switch; a ground system transmitting radio frequency unit connected to the third switch; a fourth switch connected to the satellite system transmitting radio frequency unit and the ground system transmitting radio frequency unit, whose output is supplied to the duplexer; and a CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to a first control signal; the synthesizer produces a local signal suitably used to convert the ground system RF signal into an IF signal in response to a second control signal; and the demodulator and the modulator are controlled so as to be operable by the modulating/demodulating methods of the satellite communication system in response to a third control signal.

A mobile communication system, according to the present invention, is comprised of a relaying apparatus including: a satellite system antenna installed in a place where while a ground communication system is not available, a satellite of a satellite communication system cannot observe, for transmitting/receiving a signal of the satellite communication system; a first duplexer connected to the satellite system antenna for duplexing transmission/reception signals; a low-noise amplifier for the satellite communication system, connected to the first duplexer for amplifying a reception signal; a down converter connected to the low-noise amplifier for the satellite communication system for converting a frequency of a reception signal; a high power amplifier for the ground communication system, connected to the down converter for amplifying the frequency-converted reception signal; a second duplexer connected to the high power amplifier for the ground communication system for duplexing the transmission/reception signals; a ground system antenna connected to the second duplexer, for transmitting/receiving the signal of the ground communication system; a low-noise amplifier for the ground communication system, connected to the second duplexer for amplifying the transmission signal; an up converter connected to the low-noise amplifier for the ground communication system for converting a frequency of the transmission signal; and a high power amplifier for the satellite communication system, connected to the up converter for amplifying the frequency-converted transmission signal.

BRIEF DESCRIPTION OF THE DRAWINGS

FIG. 8 is a diagram for showing the arrangement of the relaying apparatus of the conventional mobile communication system.

BEST MODE FOR CARRYING OUT THE INVENTION

Now, a description will be made for various embodiments according to the present invention with reference to the drawings.

Embodiment 1

Figure 1:
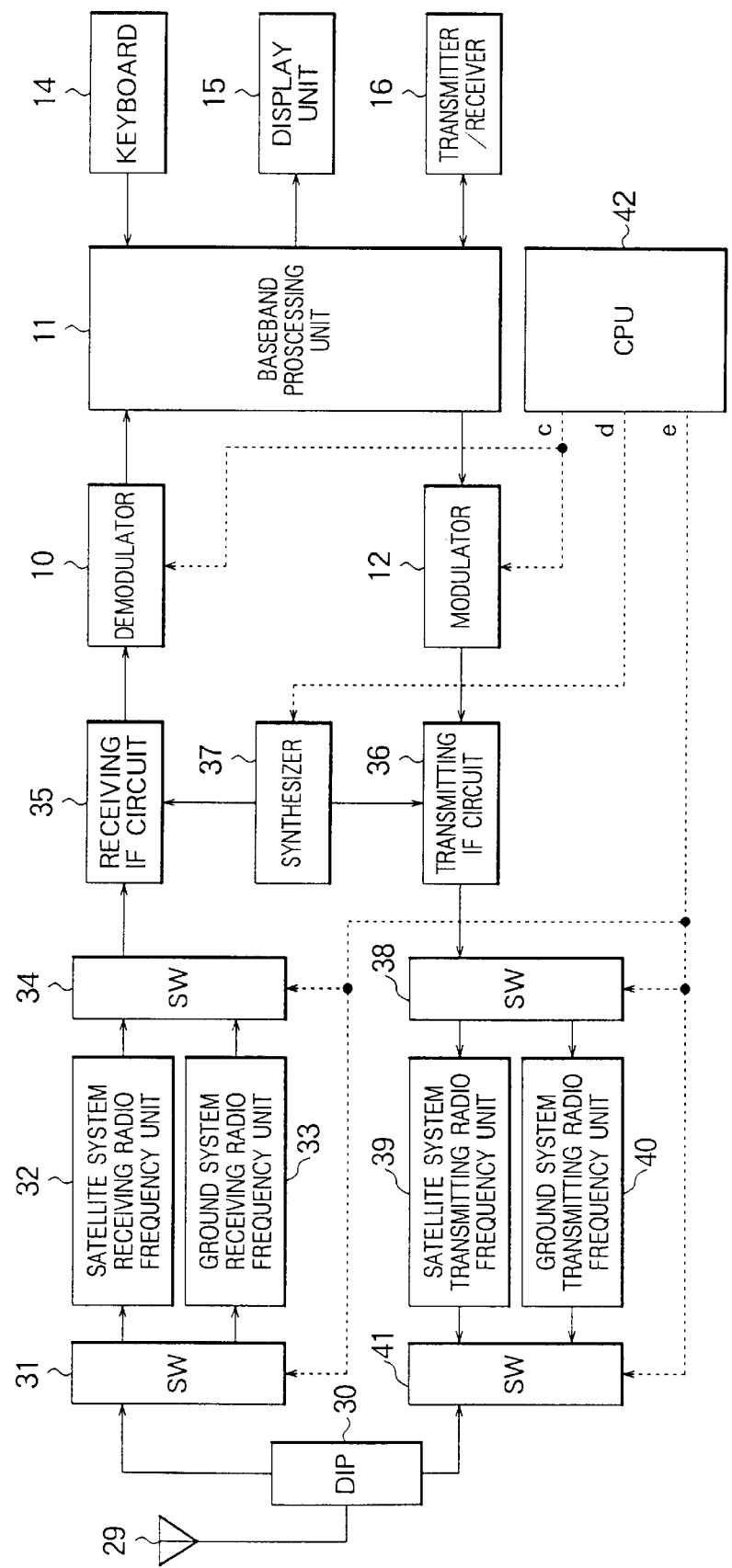
FIG. 1 is a block diagram for showing an arrangement of a portable telephone of a mobile communication system according to a first embodiment of the present invention.

Referring now to drawings, a mobile communication system equipped with a portable telephone and a relaying apparatus thereof, according to a first embodiment of the present invention, will be explained. FIG. 1 is a block diagram for representing an arrangement of the portable telephone according to the first embodiment of the present invention. It should be noted that the same reference numerals shown in the respective drawings indicate the same, or similar elements.

In FIG. 1, reference numeral 29 shows an antenna commonly used for the ground communication system and the satellite communication system; reference numeral 30 indicates a duplexer (DIP) connected to the commonly-used antenna 29; reference numeral 31 represents a first switch (SW) for switching an output of the duplexer 30; and reference numeral 32 indicates a satellite system receiving radio frequency unit connected to the first switch 31. Also, reference numeral 33 shows a ground system receiving radio frequency unit similarly connected to the first switch 31; reference numeral 34 indicates a second switch (SW) connected to the satellite system receiving radio frequency unit 32 and to the ground system receiving radio frequency unit 33; reference numeral 35 represents a receiving IF circuit connected to the second switch 34; reference numeral 10 shows a demodulator connected to the received IF circuit 35; and reference numeral 11 denotes a baseband processing unit into which the output of the demodulator 10 is entered. Furthermore, reference numeral 14 shows a keyboard connected to the baseband processing unit 11; reference numeral 15 represents a display unit for displaying the signal derived from the baseband processing unit 11; and reference numeral 16 is a transmitter/receiver connected to the baseband processing unit 11.

Also, in FIG. 1, reference numeral 12 is a modulator into which the output of the baseband processing unit 11 is entered; reference numeral 36 shows a transmitting IF circuit connected to the modulator 12; reference numeral 37 represents a synthesizer for supplying a local signal to the receiving IF circuit 35 and the transmitting IF circuit 36; reference numeral 38 is a third switch (SW) connected to the transmitting IF circuit 36; and reference numeral 39 shows a satellite system transmit radio frequency unit connected to the third switch 38. Furthermore, reference numeral 40 indicates a ground system transmitting radio frequency unit connected to the third switch 38; reference numeral 41 denotes a fourth switch (SW) connected to the satellite system transmitting radio frequency unit 39 and the ground system transmitting radio frequency unit 40; and reference numeral 42 is a CPU for controlling the ground communication system and the satellite communication system.

Figure 2:
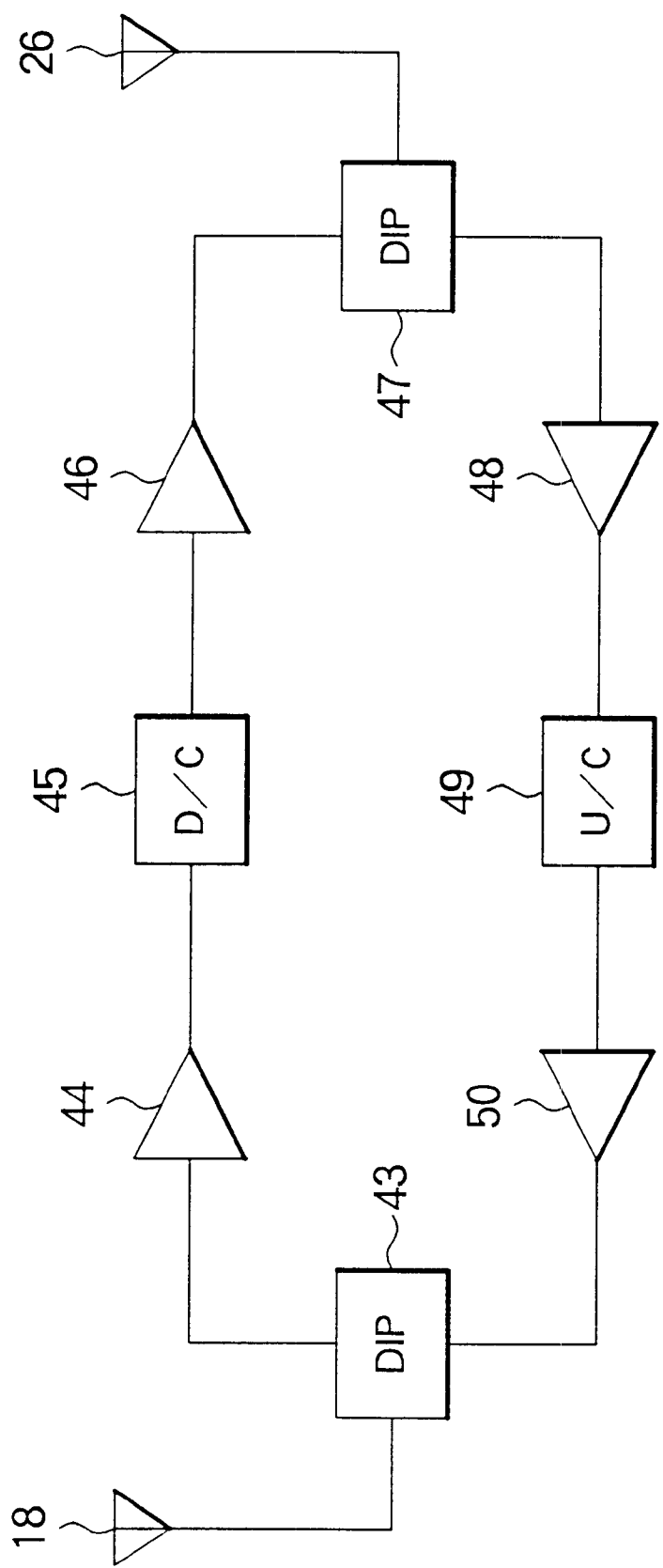
FIG. 2 is a diagram for representing an arrangement of a relaying apparatus of the mobile communication system according to the first embodiment of the present invention.

FIG. 2 is a diagram for representing an arrangement of a relaying apparatus of the mobile communication system according to the first embodiment of the present invention.

In FIG. 2, reference numeral 18 shows a satellite system antenna; reference numeral 43 represents a first duplexer (DIP) connected to the satellite system antenna 18; reference numeral 44 denotes a satellite system low-noise amplifier connected to the first duplexer 43; reference numeral 45 indicates a down-converter (D/C) connected to the satellite system low-noise amplifier 44; and reference numeral 46 is a ground system high-power amplifier connected to the down-converter 45. Also, reference numeral 47 shows a second duplexer (DIP) connected to the high-power amplifier 46; reference numeral 26 represents a ground system antenna connected to the second duplexer 47; reference numeral 48 indicates a ground system low-noise amplifier connected to the second duplexer 47; reference numeral 49 indicates an up-converter(U/C), and reference numeral 50 represents a satellite system high-power amplifier connected to the up-converter 49.

Figure 3:
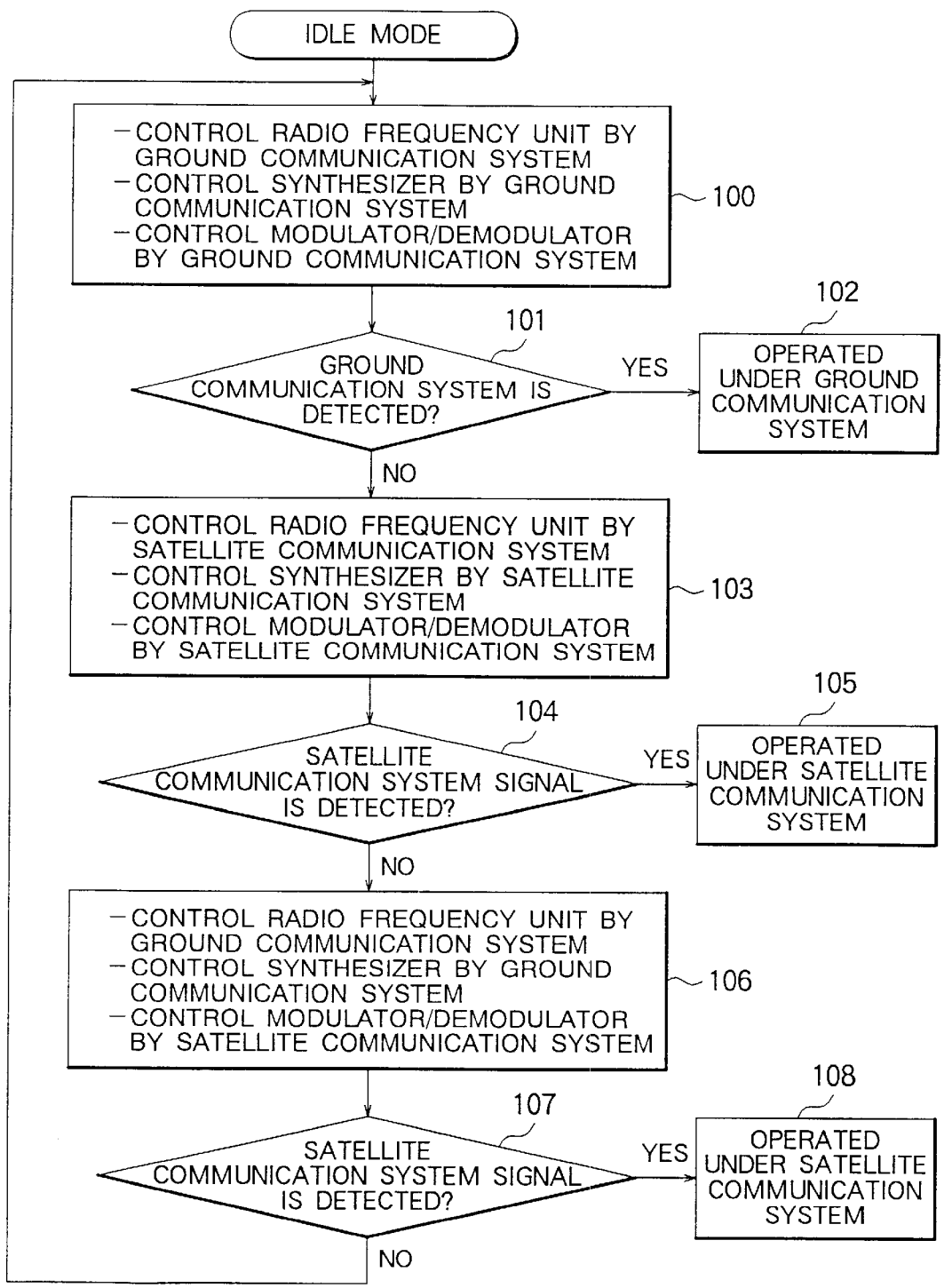
FIG. 3 is a flow chart for describing operations of the portable telephone according to the first embodiment of the present invention.

Referring now to the drawings, operations of the portable telephone and the relaying apparatus thereof employed in the mobile communication system according to the first embodiment will be described. FIG. 3 is a flow chart for describing operations of the CPU employed in the portable telephone according to the first embodiment of the present invention.

First, the operations of the keyboard 14, the display unit 15, the transmitter/receiver 16, and the baseband processing unit 11 of the portable telephone shown in FIG. 1 are similar to those of the prior art.

In the case that the portable telephone is used in the ground communication system, a signal of the ground communication system which is received by the commonly-used antenna 29 is entered via the duplexer 30 to the first switch 31.

The first switch 31 is connected to the ground system receiving radio frequency unit 33 in response to a control signal "e" issued from the CPU 42, so that the signal of the ground communication system is supplied to the second switch 34. Also, the second switch 34 is controlled so as to select the ground system receiving radio frequency unit 33 in response to the control signal "e" sent from the CPU 42, so that an output signal from the second switch 34 is supplied to the receiving IF circuit 35.

In the receiving IF circuit 35, a reception signal which has been converted into an IF frequency band based on the local signal supplied from the synthesizer 37 is demodulated by the demodulator 10, and then the demodulated signal is sent to the baseband processing unit 11.

In this case, the frequency of the local signal supplied from the synthesizer 37 is set to such a frequency suitable to convert the RF signal frequency band of the ground communication system into the IF signal in response to a control signal "d" supplied from the CPU 42.

Also, the demodulator 10 is controlled in response to another control signal "c" issued from the CPU 42 in such a manner that the demodulating system and the information transfer speed of this demodulator 10 are suitably set to demodulate the signal of the ground communication system.

On the other hand, also in the transmission system, the modulator 12 is controlled in response to the control signal "c" issued from the CPU 42 in such a manner that the modulating system and the information transfer speed of this modulator 12 are suitably set to modulate the signal of the ground communication system.

The output signal from the modulator 12 is converted into an RF signal band of the ground system by the transmitting IF circuit 36, and then this RF signal is inputted via the third switch 38 to the ground system transmitting radio frequency unit 40.

In this case, similar to the reception system, the local signal derived from the synthesizer 37, which is supplied to the transmitting IF circuit 36, is controlled so as to be suitable for the ground communication system in response to another control signal "d" sent from the CPU 42. Also, the third switch 38 is controlled in such a manner that the output signal of the transmitting IF circuit 36 is connected to the ground system transmitting radio frequency unit 40 in response to another control signal "e" sent from the CPU 42.

Furthermore, since the fourth switch 41 is controlled so as to select the output of the ground system transmitting radio frequency unit 40 in response to the control signal "e" issued from the CPU 42, the output of the ground system transmitting radio frequency unit 40 is transmitted via the fourth switch 41, the duplexer 30, and the commonly-used antenna 29 to a base station of the ground communication system.

Next, in such a case that the portable telephone is used in the satellite communication system, both of the first switch 31 and the second switch 34 are controlled in response to the control signal "e" sent from the CPU 42 in such a manner that an RF signal of the satellite communication system which has been entered via the commonly-used antenna 29 and the duplexer 30 is entered via the satellite system receiving radio frequency unit 32 to the receiving IF circuit 35.

In the receiving IF circuit 35, the RF frequency band of this RF signal of the satellite communication system is converted into an IF frequency band in response to such a local signal suitably selected to convert the RF signal into the IF signal. Next, the IF signal inputted to the demodulator 10 is demodulated based upon the demodulating system and the information transfer speed suitable for the satellite communication system, and then the demodulated IF signal is sent to the baseband processing unit 11.

Also, in the transmitting system, both a modulating system and an information transfer speed, which are suitable for the satellite communication system, are set to the modulator 12 in response to the control signal "c" sent from the CPU 42. In response to the control signal "d" derived form the CPU 42, the local signal derived from the synthesizer 37 is set to such a frequency suitable for converting the IF signal into the RF frequency band of the satellite communication system.

The third switch 38 and the fourth switch 41 are controlled by the control signal "e" derived from the CPU 42 in such a manner that the RF signal supplied from the transmitting IF circuit 36 is sent via the satellite system transmitting radio frequency unit 39 to the duplexer 30.

In such a place where the ground communication system cannot be used, the satellite communication system is used. However, this satellite communication system cannot be used in an indoor area through which the satellites cannot observe. In the case that a satellite portable telephone is used in such an indoor place, the satellite relaying apparatus shown in FIG. 2 is used.

First, in the portable telephone shown in FIG. 1, the CPU 42 sets the modulating/demodulating system and the information transfer speed of the satellite communication system with respect to the demodulator 10 and the modulator 12 in response to the control signal "c". Also, the CPU 42 sets a local frequency to the synthesizer 37 suitable for the conversion of the RF frequency and the IF signal of the ground communication system in response to the control signal "d". Furthermore, the CPU 42 controls both of the first switch 31 and the second switch 34 in such a manner that the reception RF signal may pass through the ground system receiving radio frequency unit 33 in response to the control signal "e", and also controls the third switch 38 and the fourth switch 41 in such a manner that the transmission RF signal may pass through the ground system transmitting radio frequency unit 40.

The respecting apparatus shown in FIG. 2, which is installed in a place such as a window side of a house where the satellites can observe, receives a reception RF signal of the satellite communication system by way of the satellite system antenna 18.

The reception RF signal of the satellite communication system which is received is supplied via the first duplexer 43 to the satellite system low-noise amplifier 44 so as to be amplified. Then, the amplified RF signal is converted by the down-converter 45 into an RF signal frequency of the ground communication system.

The reception signal which has been converted into the RF signal frequency of the ground communication system is amplified by the ground system high power amplifier 46, and then the amplified reception signal is transmitted via the second duplexer 47 from the ground system antenna 26.

Although the signal transmitted from the ground system antenna 26 owns the RF signal frequency band of the ground communication system, the modulating method and the information transfer speed thereof correspond to those of the signal for the satellite communication system. This signal is received by the commonly-used antenna 29 of the satellite portable telephone shown in FIG. 1 to be entered into the receiving IF circuit 35 via the ground system receiving radio frequency unit 33.

Since the local frequency of the synthesizer 37 is set in such a way that the signal having the RF frequency band of the ground communication system is converted into the IF frequency in the receiving IF circuit 35, the signal having the correct IF frequency band is entered into the demodulator 10.

In this case, since the satellite communication system has been set to the demodulator 10 in response to the control signal "c", the signal of the satellite communication system may be correctly demodulated.

Conversely, the IF signal modulated by the modulator 12 to which the satellite communication system has bee set is converted into the RF frequency band signal for the ground communication system in the transmitting IF circuit 36. Then, the converted signal is transmitted via the ground system transmitting radio frequency unit 40 from the commonly-used antenna 29.

This transmission signal is received by the ground system antenna 26 of the relaying apparatus in FIG. 2 and then is supplied via the second duplexer 47 to the ground system low-noise amplifier 48. Thereafter, the amplified signal is converted into the RF frequency band of the satellite communication system by the up-converter 49.

The transmission signal which has been frequency-converted into the RF frequency band of the satellite communication system is amplified by the satellite system high-power amplifier 50, and thereafter the amplified signal is transmitted via the first duplexer 43 and the satellite system antenna 18 to a satellite.

These control sequential operations by the CPU 42 are shown in FIG. 3. That is, at step 100, the CPU 42 controls the ground communication system to set the radio frequency unit, the synthesizer, and the modulator/demodulator (modem).

Next, at steps 101 to 102, when the CPU 42 detects a synchronized word of the ground communication system, this CPU 42 is operated in the ground communication system.

Next, at step 103, when the synchronized word of the ground communication system is not detected, the CPU 42 control the satellite communication system to set the radio frequency unit, the synthesizer, and the modulator/demodulator.

Next, at steps 104 to 105, when the CPU 42 detects a synchronized word of the satellite communication system which is different from the synchronized word of the ground communication system, the CPU 42 is operated in the satellite communication system.

Next, at step 106, when the CPU 42 does not detect the synchronized word of the satellite communication system, the CPU 42 controls the ground communication system to set the radio frequency unit and the synthesizer, and controls the satellite communication system to set the modulator/demodulator.

Subsequently, at steps 107 to 108, when the synchronized word of the satellite communication is detected, the CPU 42 is operated in the satellite repeating system. It should be noted that in this case, even when the CPU 42 judges "synchronized word of the satellite communication system" identical to that of the step 104, since the condition defined at the previous step is different from that of the step 104, the CPU 42 can make a discrimination.

Then, when the CPU 42 does not detect the sync word of the satellite communication system, the process operation is returned to the step 100.

Embodiment 2

Figure 4:
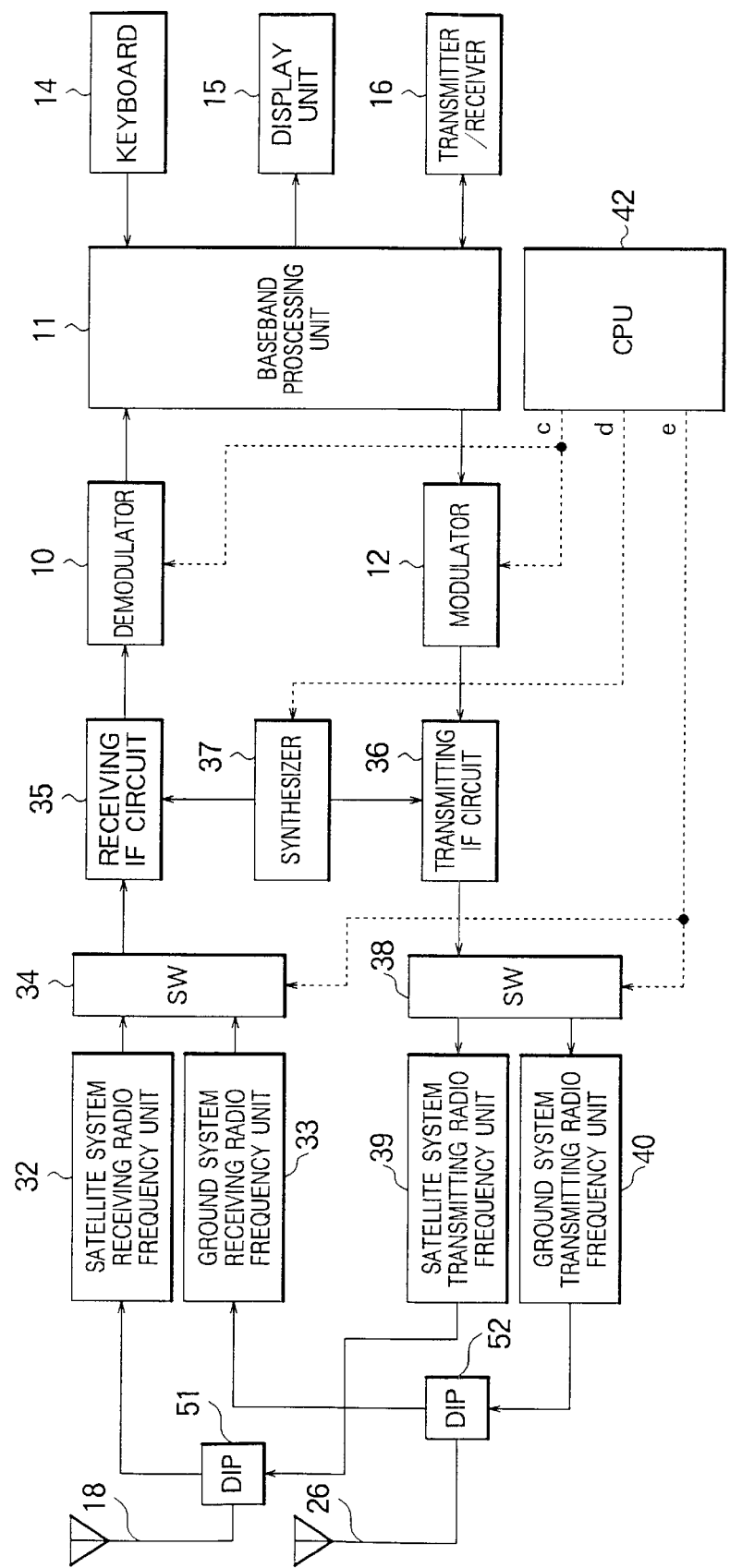
FIG. 4 is a block diagram for indicating an arrangement of a portable telephone of a mobile communication system according to a second embodiment of the present invention.

A portable telephone of a mobile communication system according to a second embodiment of the present invention will now be explained with reference to a drawing. FIG. 4 is a block diagram for indicating an arrangement of the portable telephone according to the second embodiment of the present invention.

In the portable telephone according to the above-described first embodiment, while the commonly-used antenna 29 which can be commonly used in the ground communication system and in the satellite communication system is employed, the satellite system receiving radio frequency unit 32 and the ground system receiving radio frequency unit 33, as well as the satellite system transmitting radio frequency unit 39 and the ground system transmitting radio frequency unit 40, are switched by way of the switch. To the contrary, in the portable telephone according to this second embodiment of the present invention, as shown in FIG. 4, a satellite system antenna and a ground system antenna are separately provided, which may achieve a similar effect to that of the above-described first embodiment.

In FIG. 4, reference numeral 18 shows a satellite system antenna; reference numeral 26 indicates a ground system antenna; reference numeral 51 denotes a first duplexer (DIP) connected to the satellite system antenna 18; reference numeral 52 represents a second duplexer (DIP) connected to the ground system antenna 26; reference numeral 32 indicates a satellite system receiving radio frequency unit connected to the first duplexer 51. Also, reference numeral 33 shows a ground system receiving radio frequency unit connected to the second duplexer 52; reference numeral 34 indicates a second switch (SW) connected to the satellite system receiving radio frequency unit 32 and the ground system receiving radio frequency unit 33; reference numeral 35 represents a receiving IF circuit connected to the second switch 34; reference numeral 10 shows a demodulator connected to the received IF circuit 35; and reference numeral 11 denotes a baseband processing unit into which the output of the demodulator is entered. Furthermore, reference numeral 14 shows a keyboard connected to the baseband processing unit 11; reference numeral 15 represents a display unit for displaying the signal derived from the baseband processing unit 11; and reference numeral 16 is a transmitter/receiver connected to the baseband processing unit 11.

Also, in the drawing, reference numeral 12 is a modulator into which the output of the baseband processing unit 11 is entered; reference numeral 36 shows a transmitting IF circuit connected to the modulator 12; reference numeral 37 represents a synthesizer for supplying a local signal to the receiving IF circuit 35 and the transmitting IF circuit 36; Reference numeral 38 is a third switch (SW) connected to the transmitting IF circuit 36; and reference numeral 39 shows a satellite system transmit radio frequency unit connected to the third switch 38. Furthermore, reference numeral 40 indicates a ground system transmitting radio frequency unit connected to the third switch 38; and reference numeral 42 is a CPU for controlling the ground communication system and the satellite communication system.

Embodiment 3

Figure 5:
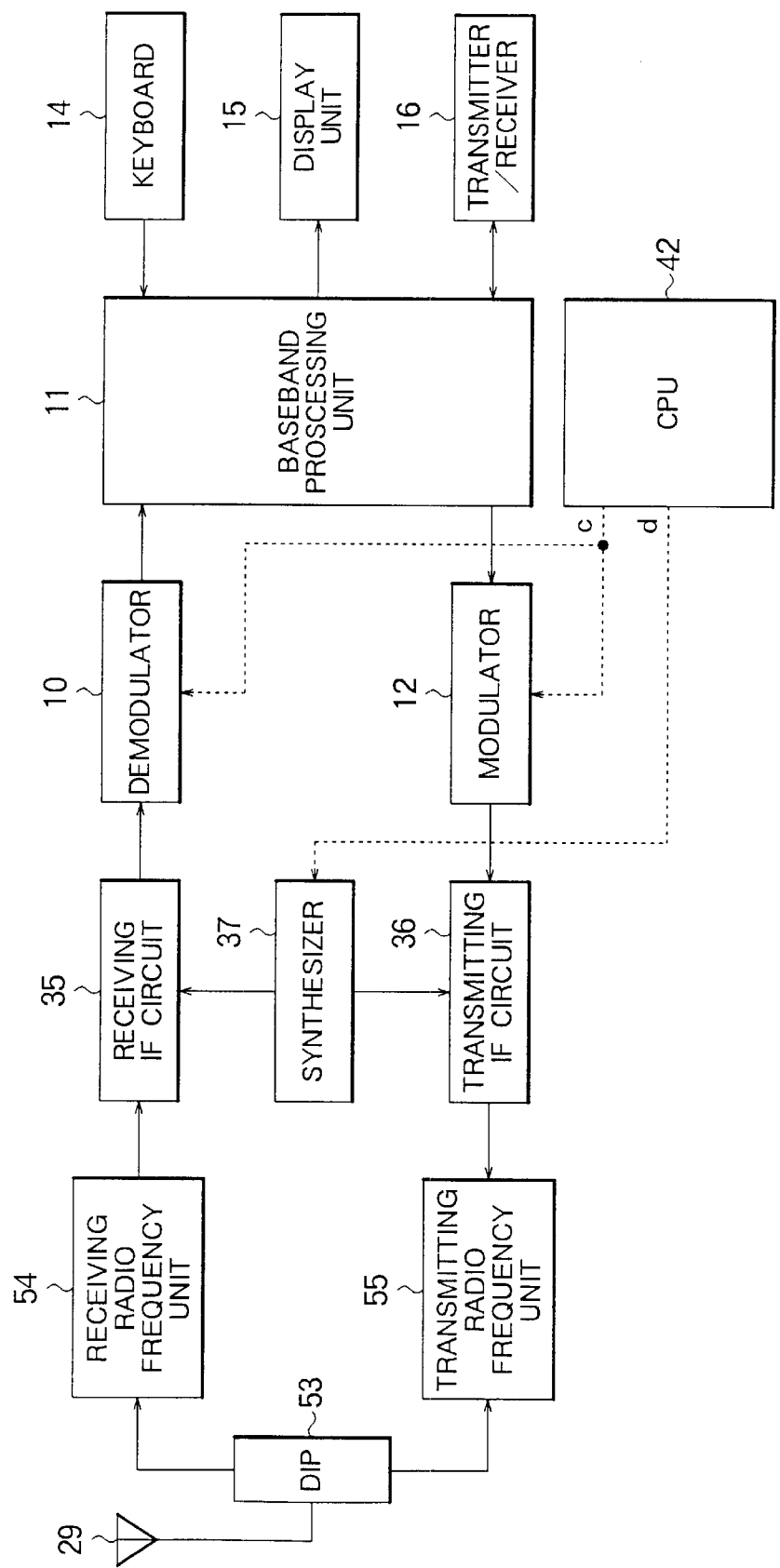
FIG. 5 is a block diagram for indicating an arrangement of a portable telephone of a mobile communication system according to a third embodiment of the present invention.
Figure 6:
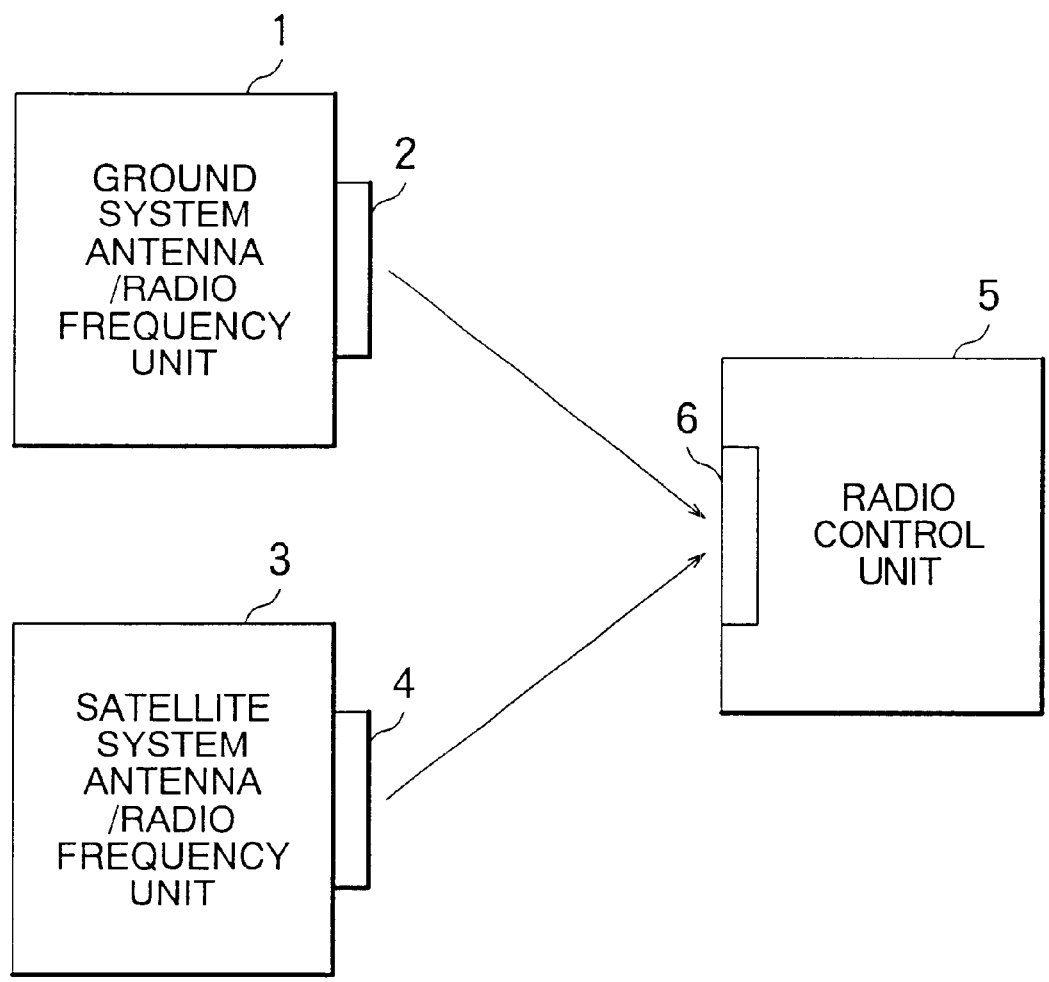
FIG. 6 is a diagram for showing the arrangement of the portable telephone of the conventional mobile communication system.
Figure 7:
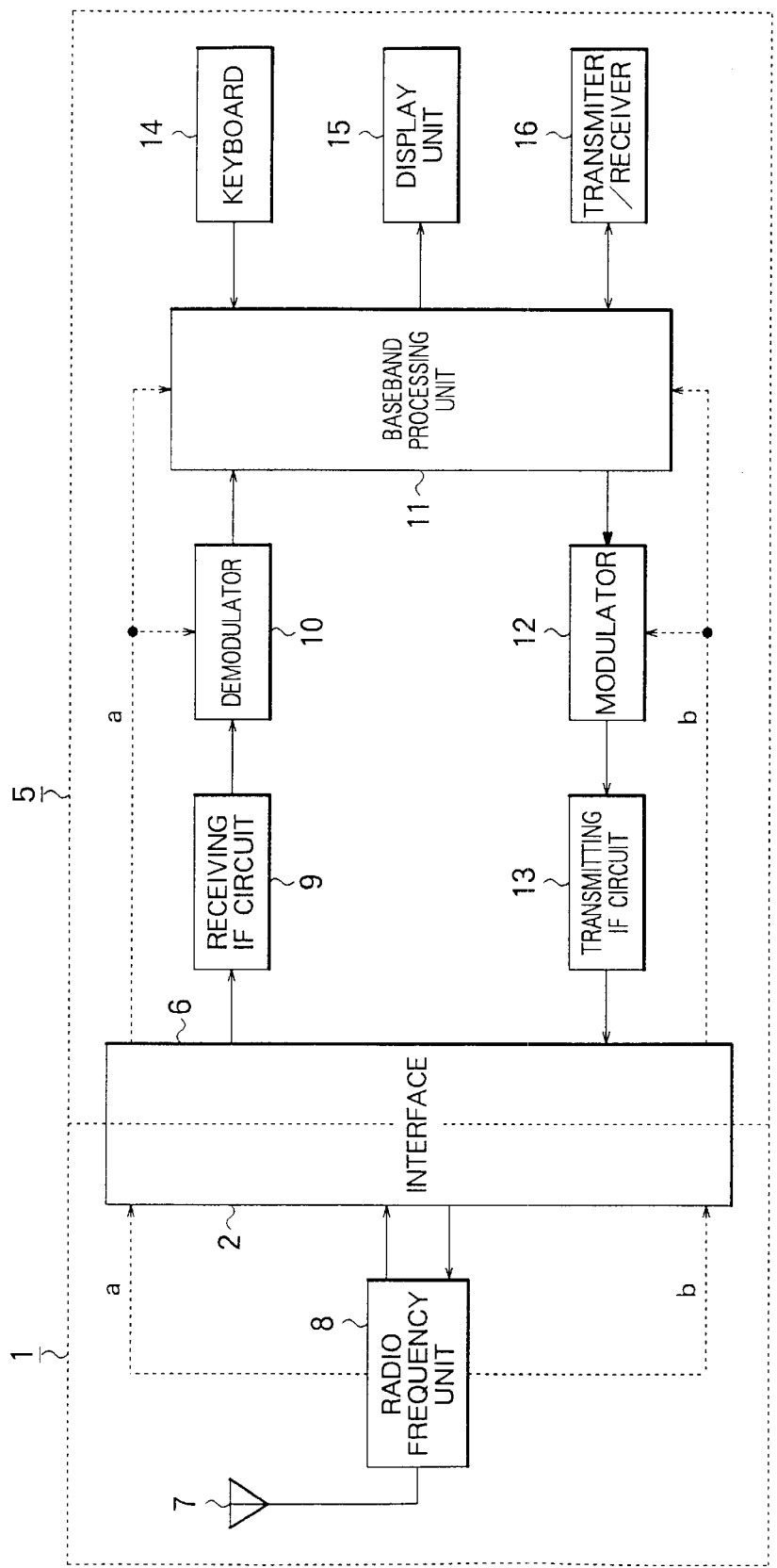
FIG. 7 is a block diagram for representing an arrangement of the ground system antenna/radio frequency unit of the conventional portable telephone.

A portable telephone of a mobile communication system according to a third embodiment of the present invention will now be explained with reference to a drawing. FIG. 5 is a block diagrams for indicating an arrangement of the portable telephone according to the third embodiment of the present invention.

In the portable telephone according to the above-described first embodiment, while the commonly-used antenna 29 which can be commonly used in the ground communication system and the satellite communication system is employed, the satellite system receiving radio frequency unit 32 and the ground system receiving radio frequency unit 33, as well as the satellite system transmitting radio frequency unit 39 and the ground system transmitting radio frequency unit 40, are switched by way of the switch. As represented in FIG. 5, in the portable telephone according to this third embodiment of the present invention, a receiving radio frequency unit and a transmitting radio frequency unit which can commonly process signals in both the satellite communication system and the ground communication system are provided. A switch for switching the satellite communication system and the ground communication system is no longer required. Also, the portable telephone can be operated without receiving the control signal "e" supplied from the CPU, which may achieve a similar effect to that of the above-described first embodiment.

In FIG. 5, reference numeral 29 shows an antenna commonly used for the ground communication system and the satellite communication system; reference numeral 53 indicates a duplexer (DIP) connected to the commonly-used antenna 29; and reference numeral 54 indicates a receiving radio frequency unit connected to the duplexer 53. Also, reference numeral 35 represents a receiving IF circuit connected to the receiving radio frequency unit 54; reference numeral 10 shows a demodulate connected to the received IF circuit 35; and reference numeral 11 denotes a baseband processing unit into which the output of the demodulator is entered. Furthermore, reference numeral 14 shows a keyboard connected to the baseband processing unit 11; reference numeral 15 represents a display unit for displaying the signal derived from the baseband processing unit 11; and reference numeral 16 is a transmitter/receiver connected to the baseband processing unit 11.

Also, in the drawing, reference numeral 12 is a modulator into which the output of the baseband processing unit 11 is entered; reference numeral 36 shows a transmitting IF circuit connected to the modulator 12; reference numeral 37 represents a synthesizer for supplying a local signal to the receiving IF circuit 35 and the transmitting IF circuit 36; reference numeral 55 indicates a transmitting radio frequency unit connected to the transmitting IF circuit 36; and reference numeral 42 is a CPU for controlling the ground communication system and the satellite communication system.

In this case, both the receiving radio frequency unit 54 and the transmitting radio frequency 55 are set to be operable in a broad band containing, for example, 900 MHz and 2 GHz bands, and also are tuned to 2 frequency bands of the 900 MHz band and also to the 2 GHz band in order that these radio frequency units are operable both in the ground communication system and in the satellite communication system.

Possibility of Utilization in Industrial Field

As previously explained, the mobile communication system, according to the present invention, is comprised of: the portable telephone useable for automatically switching the ground communication system and the satellite communication system, in which in such a case that while the ground satellite system is not available in the place where the satellite of the satellite communication system cannot observe, the radio interface of the ground satellite system is different from the radio interface of the satellite communication system, the signal process operation is switched in such a manner that the RF signal is processed by the ground communication system, and both of the IF signal and the baseband signal are processed by the satellite communication system; and the relaying apparatus for performing the converting operation of the RF signal in the satellite communication system and the RF signal in the satellite communication system. As a consequence, there are such effects that the ground communication system and the satellite communication system can be automatically switched to be operable without replacing the antenna/radio frequency units. Also, when the satellite communication system is used in the indoor area, the structure of the relaying apparatus can be simplified.

Also, as previously described, the mobile communication system, according to the present invention, is arranged by such that the portable telephone including: the commonly-used antenna for transmitting/receiving the signal of the ground communication system and also the signal of the satellite communication system; the duplexer connected to the commonly-used antenna for duplexing transmission/reception signals; the first switch for switching the output of the commonly-used antenna; the satellite system receiving radio frequency unit connected to the first switch; the ground system receiving radio frequency unit connected to the first switch; the second switch connected to the satellite system receiving radio frequency unit and to the ground system receiving radio frequency unit; the receiving IF circuit connected to the second switch; the demodulator for demodulating the output of the receiving IF circuit; the baseband processing unit into which the demodulation output of the demodulator is entered; the modulator for modulating the output of the baseband processing unit; the transmitting IF circuit connected to the modulator; the synthesizer for supplying the local signal to the receiving IF circuit and the transmitting IF circuit; the third switch connected to the transmitting IF circuit; the satellite system transmitting radio frequency unit connected to the third switch; the ground system transmitting radio frequency unit connected to the third switch; the fourth switch connected to the satellite system transmitting radio frequency unit and the ground system transmitting radio frequency unit, whose output is supplied to the duplexer; and the CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to the first control signal; the synthesizer produces the local signal suitably used to convert the ground system RF signal into the IF signal in response to the second control signal; and the demodulator and the modulator are controlled so as to be operable by the modulating/demodulating methods of the satellite communication system in response to the third control signal. As a result, there is such the effect that the ground communication system and the satellite communication system can be automatically switched to be operable without replacing the antenna/radio frequency units.

Also, as previously described, the mobile communication system, according to the present invention, is arranged by such that the portable telephone including: the satellite system antenna for transmitting/receiving the signal of the satellite communication system; the ground system antenna for transmitting/receiving the signal of the ground communication system; the first duplexer connected to the satellite system antenna for duplexing the transmission/reception signal of the satellite communication system; the second duplexer connected to the ground system antenna for duplexing the transmission/reception signal of the ground communication system; the satellite system receiving radio frequency unit connected to the first duplexer; the ground system receiving radio frequency unit connected to the second duplexer; the first switch connected to the satellite system receiving radio frequency unit and to the ground system receiving radio frequency unit; the receiving IF circuit connected to the first switch; the demodulator for demodulating the output of the receiving IF circuit; the baseband processing unit into which the demodulation output of the demodulator is entered; the modulator for modulating the output of the baseband processing unit; the transmitting IF circuit connected to the modulator; the synthesizer for supplying the local signal to the receiving IF circuit and the transmitting IF circuit; the second switch connected to the transmitting IF circuit; the satellite system transmitting radio frequency unit connected to the second switch, the output of which is supplied to the first duplexer; the ground system transmitting radio frequency unit connected to the second switch, the output of which is supplied to the second duplexer; and the CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the first and second switches are controlled so as to connect the ground system receiving radio frequency unit and the ground system transmitting radio frequency unit in response to the first control signal; the synthesizer produces the local signal suitably used to convert the ground system RF signal into the IF signal in response to the second control signal; and the demodulator and the modulator are controlled so as to be operable by the modulating/demodulating methods of the satellite communication system in response to the third control signal. As a result, there is such effects that the ground communication system and the satellite communication system can be automatically switched to be operable without replacing the antenna/radio frequency units.

Also, as previously described, the mobile communication system, according to the present invention, is arranged by such that the portable telephone including: the commonly-used antenna for transmitting/receiving the signal of the ground communication system and also the signal of the satellite communication system; the duplexer connected to the commonly-used antenna, for duplexing transmission/reception signals; the receiving radio frequency unit connected to the duplexer, capable of commonly processing the reception signal of the ground communication system and the reception signal of the satellite communication system; the receiving IF circuit connected to the receiving radio frequency unit; the demodulator for demodulating the output of the receiving IF circuit; the baseband processing unit into which the demodulation output of the demodulator is entered; the modulator for modulating the output of the baseband processing unit; the transmitting IF circuit connected to the modulator; the synthesizer for supplying the local signal to the receiving IF circuit and the transmitting IF circuit; the transmitting radio frequency unit connected to the transmitting IF circuit, capable of commonly processing the transmission signal of the ground communication system and the reception signal of the satellite communication system and to the output of which is supplied to the duplexer; and the CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to the first control signal; the synthesizer produces the local signal suitably used to convert the ground system RF signal into the IF signal in response to the second control signal; and the demodulator and the modulator are controlled so as to be operable by the modulating/demodulating methods of the satellite communication system in response to the third control signal. As a result, there is such the effect that the ground communication system and the satellite communication system can be automatically switched to be operable without replacing the antenna/radio frequency units.

Also, as previously described, the mobile communication system, according to the present invention, is comprised of: the portable telephone including: the commonly-used antenna for transmitting/receiving the signal of the ground communication system and also the signal of the satellite communication system; the duplexer connected to the commonly-used antenna for duplexing transmission/reception signals; the first switch for switching the output of the duplexer; the satellite system receiving radio frequency unit connected to the first switch; the ground system receiving radio frequency unit connected to the first switch; the second switch connected to the satellite system receiving radio frequency unit and to the ground system receiving radio frequency unit; the receiving IF circuit connected to the second switch; the demodulator for demodulating the output of the receiving IF circuit; the baseband processing unit into which the demodulation output of the demodulator is entered; the modulator for modulating the output of the baseband processing unit; the transmitting IF circuit connected to the modulator; the synthesizer for supplying the local signal to the receiving IF circuit and the transmitting IF circuit; the third switch connected to the transmitting IF circuit; the satellite system transmitting radio frequency unit connected to the third switch; the ground system transmitting radio frequency unit connected to the third switch; the fourth switch connected to the satellite system transmitting radio frequency unit and the ground system transmitting radio frequency unit, whose output is supplied to the duplexer; and the CPU for controlling the first, second, third, and fourth switches in the case that while the ground satellite system is not available in the place where the satellite of the satellite communication system cannot observe, the radio interface of the ground communication system is different from the radio interface of the satellite communication system, in such a manner that the ground system receiving radio frequency unit is connected to the ground system transmitting radio frequency unit in response to the first control signal; the synthesizer produces the local signal suitably used to convert the ground system RF signal into the IF signal in response to the second control signal; and the demodulator and the modulator are controlled so as to be operable by the modulating/demodulating methods of the satellite communication system in response to the third control signal. As a result, there is such the effect that the ground communication system and the satellite communication system can be automatically switched to be operable without replacing the antenna/radio frequency units.

Also, as previously described, the mobile communication system, according to the present invention, is arranged by comprising the relaying apparatus including: the satellite system antenna installed in the place where while the ground communication system is not available, the satellite of the satellite communication system cannot observe, for transmitting/receiving the signal of the satellite communication system; the first duplexer connected to the satellite system antenna, for duplexing transmission/reception signals; the low-noise amplifier for the satellite communication system, connected to the first duplexer for amplifying the reception signal; the down converter connected to the low-noise amplifier for the satellite communication system, for converting a frequency of the reception signal; the high power amplifier for the ground communication system, connected to the down converter for amplifying the frequency-converted reception signal; the second duplexer connected to the high power amplifier for the ground communication system, for duplexing the transmission/reception signals; the ground system antenna connected to the second duplexer, for transmitting/receiving the signal of the ground communication system; the low-noise amplifier for the ground communication system, connected to the second duplexer, for amplifying the transmission signal; the up converter connected to the low-noise amplifier for the ground communication system, for converting a frequency of the transmission signal; and the high power amplifier for the satellite communication system, connected to the up converter, for amplifying the frequency-converted transmission signal. As a consequence, there are such effects that when the satellite communication system is used in the indoor area, the structure of the relaying apparatus can be simplified.

What is claimed is:

1. A mobile communication system comprising:
   a ground communication system, said ground communication system including a radio interface;
   a satellite communication system, said satellite communication system including a radio interface, said satellite communication system communicating with at least one satellite;
   a relaying apparatus for converting an RF signal in the satellite communication system into an RF signal in the ground communication system;
   a portable telephone;
   said portable telephone automatically switching between said ground communication system and said satellite communication system, wherein:
     while said ground communication system is not available; and
     said portable telephone is in a place where said satellite of said satellite communication system cannot be observed;
     a signal process operation, said signal process operation being switched in such a manner that:
       an RF signal from said satellite communication system is converted by said relay apparatus into an RF signal in said ground communication system, and is processed by said ground communication system, and both of an IF signal and a baseband signal are processed by said satellite communication system; and
     wherein said portable telephone includes:
       a commonly-used antenna for transmitting/receiving the signal of said ground communication system and also the signal of said satellite communication system;
       a duplexer connected to said commonly-used antenna, for duplexing transmission/reception signals;
       a first switch for switching an output of said duplexer;
       a satellite system receiving radio frequency unit connected to said first switch;
       a ground system receiving radio frequency unit connected to said first switch;
       a second switch connected to said satellite system receiving radio frequency unit and to said ground system receiving radio frequency unit;
       a receiving IF circuit connected to said second switch;
       a demodulator for demodulating an output of said receiving IF circuit;
       a baseband processing unit into which the demodulation output of said demodulator is entered;
       a modulator for modulating an output of said baseband processing unit;
       a transmitting IF circuit connected to said modulator;
       a synthesizer for supplying a local signal to said receiving IF circuit and to said transmitting IF circuit;
       a third switch connected to said transmitting IF circuit;
       a satellite system transmitting radio frequency unit connected to said third switch;
       a ground system transmitting radio frequency unit connected to said third switch;
       a fourth switch connected to said satellite system transmitting radio frequency unit and to said ground system transmitting radio frequency unit, whose output is supplied to said duplexer; and
       a CPU for controlling said first, second, third, and fourth switches in such a manner that the first and second switches are controlled so as to connect said ground system receiving radio frequency unit and said ground system transmitting radio frequency unit in response to a first control signal;

said synthesizer produces a local signal suitably used to convert said ground system RF signal into an IF signal in response to a second control signal; and said demodulator and said modulator are controlled so as to be operable by the modulating/demodulating methods of said satellite communication system in response to a third control signal.

2. A mobile communication system comprising:

a portable telephone including:

a commonly-used antenna for transmitting/receiving a signal of a ground communication system and also a signal of a satellite communication system;

a duplexer connected to said commonly-used antenna, for duplexing transmission/reception signals;

a first switch for switching an output of said commonly-used antenna;

a satellite system receiving radio frequency unit connected to said first switch;

a ground system receiving radio frequency unit connected to said first switch;

a second switch connected to said satellite system receiving radio frequency unit and to said ground system receiving radio frequency unit;

a receiving IF circuit connected to said second switch;

a demodulator for demodulating an output of said receiving IF circuit;

a baseband processing unit into which the demodulation output of said demodulator is entered;

a modulator for modulating an output of said baseband processing unit;

a transmitting IF circuit connected to said modulator;

a synthesizer for supplying a local signal to said receiving IF circuit and said transmitting IF circuit;

a third switch connected to said transmitting IF circuit;

a satellite system transmitting radio frequency unit connected to said third switch;

a ground system transmitting radio frequency unit connected to said third switch;

a fourth switch connected to said satellite system transmitting radio frequency unit and said ground system transmitting radio frequency unit, whose output is supplied to said duplexer; and a CPU for controlling said first, second, third, and fourth switches in the case that while said satellite system is not available at said place where the satellite of said satellite communication system cannot be observed, the radio interface of said ground communication system is different from the radio interface of said satellite communication system, in such a manner that said ground system receiving radio frequency unit is connected to said ground system transmitting radio frequency unit in response to a first control signal;

said synthesizer produces a local signal suitably used to convert said ground system RF signal into an IF signal in response to a second control signal; and said demodulator and said modulator are controlled so as to be operable by the modulating/demodulating methods of said satellite communication system in response to a third control signal.

* * * * *